(12) United States Patent
Yotani et al.

(10) Patent No.: US 6,170,811 B1
(45) Date of Patent: Jan. 9, 2001

(54) LIQUID FILLED VIBRATION ISOLATOR

(75) Inventors: Yorishige Yotani, Inuyama; Shingo Suzuki, Komaki, both of (JP)

(73) Assignee: Tokai Rubber Industries, Ltd., Komaki (JP)

( * ) Notice: Under 35 U.S.C. 154(b), the term of this patent shall be extended for 0 days.

(21) Appl. No.: 09/212,865

(22) Filed: Dec. 17, 1998

(30) Foreign Application Priority Data

Dec. 26, 1997 (JP) .................................................... 9-359897

(51) Int. Cl.⁷ ...................................................... F16F 13/00
(52) U.S. Cl. .......................................................... 267/140.13
(58) Field of Search ............................ 267/141.1, 140.1, 267/140.13, 140.14, 219, 190.4, 141.4, 141.3; 248/562, 638, 636

(56) References Cited

U.S. PATENT DOCUMENTS

| 4,708,329 | * | 11/1987 | Tabata et al. | 267/140.1 |
| 4,796,876 |   | 1/1989  | Sciortino.    |           |
| 4,997,168 | * | 3/1991  | Kato          | 267/140.1 |
| 5,143,358 | * | 9/1992  | Hibi et al.   | 267/140.1 |
| 5,437,437 | * | 8/1995  | Takano et al. | 267/140.14 |
| 5,897,092 | * | 4/1999  | Mizutani et al. | 267/140.13 |

FOREIGN PATENT DOCUMENTS

| 0 088 682 |   | 9/1983  | (EP). |           |
| 2 122 718 |   | 1/1984  | (GB). |           |
| 2 206 668 |   | 1/1989  | (GB). |           |
| 2206668   | * | 1/1989  | (GB). | 267/140.1 |
| 8-334146  |   | 12/1996 | (JP). |           |
| WO 86/03813 |  | 7/1986  | (WO). |           |

* cited by examiner

Primary Examiner—Robert J. Oberleitner
Assistant Examiner—Devon Kramer
(74) Attorney, Agent, or Firm—Oblon, Spivak, McClelland, Maier & Neustadt, P.C.

(57) ABSTRACT

There are provided an inward-bent part 14 slightly extending to one end side of a cylindrical member 10 inwardly in a radial direction, and a thin rubber member coated part 22 on an inner peripheral surface of the cylindrical member, which the rubber member coated part has an inner diameter equal to or smaller than an inner diameter of the inward-bent part. An orifice member 32 and a diaphragm member 33 are inserted into the rubber member coated part on one end side of the cylindrical member to close thereby an opening portion on the one end side thereof. A rubber member 21 subjected to vulcanization and bonding and a fitting member 31 fixed to the rubber member 21 are provided on the other end side of the cylindrical member to close thereby an opening portion on the other end side thereof Since the inner diameter of the inward-bent part is made smaller than the outer diameter of the diaphragm member by conducting drawing to the cylindrical member, the diaphragm member is stopped by the inward-bent part. As a result, even if the fastening force is lowered by, for example, the fatigue of the rubber member coated part, it is possible to ensure preventing the diaphragm member and the like from slipping out of the cylindrical member.

3 Claims, 4 Drawing Sheets

LIQUID FILLED VIBRATION ISOLATOR

BACKGROUND OF THE INVENTION

The present invention relates to a liquid filled vibration isolator for use in, for example, an engine mount of a vehicle.

The conventional liquid filled vibration isolator of this type has, as shown in FIG. 8, for example a rubber member 2 coupled on the upper end side of a cylindrical member 1, and the rubber member 2 is provided with a fitting member 3 fixed coaxially to the cylindrical member 1. The cylindrical member 1 has a thin rubber member coated part 4 disposed continuous to the rubber member 2 on the inner peripheral surface thereof, and has an orifice member 5 and a diaphragm member 6 disposed on inner peripheral portion of the lower end side thereof from inside sequentially in the axial direction. The orifice member 5 and the diaphragm member 6 thus close the lower end side opening portion of the cylindrical member 1, and tight seal a liquid chamber E provided between them and the rubber member 2. In addition, by drawing the lower end side of the cylindrical member 1 (diameter-reducing processing) thereof, the orifice member 5 and the diaphragm member 6 are fixed to the cylindrical member 1.

Meanwhile, in the above-stated liquid filled vibration isolator, the orifice member 5 and the diaphragm member 6 are fixed to the cylindrical member 1 only by the reactive force of the rubber member coated part 4 resulting from the drawing of the cylindrical member 1. Due to this, there is a fear that the diaphragm member 6 and the like slip out of the cylindrical member 1 as a result of, for example, the fatigue of the rubber member coated part 4 if the vibration isolator are used for a long period of time.

SUMMARY OF THE INVENTION

The present invention has been made to solve the above problem. It is therefore an object of the present invention to provide a liquid filled vibration isolator capable of ensuring that the diaphragm member and the orifice member are prevented from undesirably slipping out of the cylindrical member.

A liquid filled vibration isolator according to the present invention comprises a cylindrical member made of a metal material; an inward-bent part slightly extending to one end side of the cylindrical member inwardly in a radial direction; a thin rubber member coated part provided on an inner peripheral surface of the cylindrical member, the rubber member coated part having an inner diameter equal to or smaller than an inner diameter of the inward-bent part; a bottom wall member inserted into the rubber member coated part on the one end side of the cylindrical member to close thereby an opening portion on the one end side thereof; a rubber member subjected to vulcanization and bonding and a fitting member fixed to the rubber member provided on the other end side of the cylindrical member to close thereby an opening portion on the other end side thereof; and a liquid chamber for vibration isolation thereby formed inside the cylindrical member, and is characterized in that the inner diameter of the inward-bent part is made smaller than an outer diameter of the bottom wall member by conducting drawing to the cylindrical member. An diaphragm member, an orifice member and the like are used as the bottom wall member.

With the above-stated structure of the present invention, if one end side of the cylindrical member is subjected to drawing and the diameter of the inward-bent part, which has been provided on one end portion of the cylindrical member in advance, is reduced, then the inner diameter of the inward-bent part is smaller than the outer diameter of the bottom wall member. Due to this, the outer peripheral portion of the bottom wall member is stopped by the inward-bent part. As a result, the present invention can ensure that the bottom wall member is prevented from slipping out of the cylindrical member even if the fastening force is lowered by, for example, the fatigue of the rubber member coated part.

The inward-bent part may be formed by conducting blanking to a collar-shaped inner bottom wall part formed integral with one end side of the cylindrical member while the cylindrical member is formed by press-molding a metal plate material, the inner bottom wall part extending inwardly in an radial direction. If so, it is possible to easily form the inward-bent part at low cost.

A cylindrically protruding part which slightly protrudes within a prescribed range from a prescribed position of the rubber member coated part in an axial direction to the other end side, along a circumferential direction and toward a radial direction, may be provided. In addition, a stepped part may be provided at a boundary between the rubber coated part and the cylindrically protruding part. This stepped part can be used for positioning of the bottom wall member, thereby enabling the easy and accurate insertion of the bottom wall member.

A liquid filled vibration isolator according to the second invention comprises a cylindrical member made of a metal material; a thin rubber member coated part provided on an inner peripheral surface of the cylindrical member; a bottom wall member inserted into the rubber member coated part on one end side of the cylindrical member to close thereby an opening portion on the one end side thereof; a rubber member subjected to vulcanization and bonding and a fitting member fixed to the rubber member provided on the other end side of the cylindrical member to close thereby an opening on the other end side thereof; and a liquid chamber for vibration isolation thereby formed inside the cylindrical member, and is characterized in that an diameter of the one end side of the cylindrical member is reduced by drawing and the one end portion of the cylindrical member is bent inwardly in a radial direction by bending, thereby forming an inward-bent part having an inner diameter of the one end portion almost equal to an outer diameter of the bottom wall member; one end side of the rubber member coated part is compressed and an end portion of the one end side thereof is expanded between the inner-bent part and the bottom wall member to cover a one end-side outer peripheral portion of the bottom wall member; and an inner diameter of the expanded end portion of the rubber member coated part is smaller than the outer diameter of the bottom wall member.

With the above-stated structure of the second invention, the diameter of the one end side of the cylindrical member is reduced by drawing and the end portion of the cylindrical member is subjected to bending, thereby forming an inward-bent part having an inner diameter almost equal to the outer diameter of the bottom wall member at one end portion of the cylindrical member. Following the drawing and bending, the one end side portion of the rubber member coated part is compressed. The one end side portion is then expanded between the inward-bent part and the bottom wall member to thereby cover the one end-side outer peripheral portion of the bottom wall member. The inner diameter of the expanded portion is smaller than the outer diameter of the bottom wall member. Due to this, the outer peripheral portion of the bottom wall member is stopped by the tip end portion of the rubber member coated part. As a result, according to the second invention, even if the fastening force is lowered by, for example, the fatigue of the rubber member coated part, it is ensured that the bottom wall member is prevented from slipping out of the cylindrical member.

DESCRIPTION OF THE PREFERRED EMBODIMENTS

Figure 1:
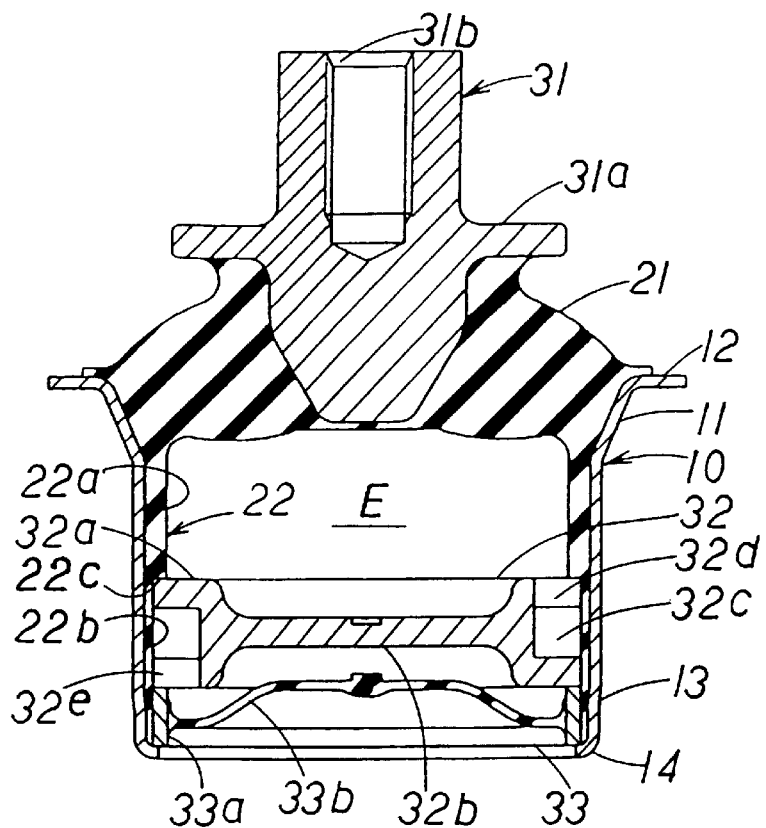
FIG. 1 is a cross sectional view showing a liquid filled vibration isolator in one embodiment according to the present invention.

One embodiment of the present invention will now be described with reference to the accompanying drawings. FIG. 1 is a cross-sectional view of a liquid filled vibration isolator in the first embodiment according to the present invention.

The liquid filled vibration isolator shown therein has a cylindrical member 10 made of a metal material. The cylindrical member 10 has a wider diameter part 11 having the upper end (the other end) side diameter is conically widened. A flange part 12 extending outward is provided on the peripheral edge portion of the opening of the wider diameter part 11. The cylindrical member 10 is formed by press-molding (drawing) of a metal plate material and provided with a reduced diameter part 13 on the lower end side thereof (one end side). The tip end portion of the reduced diameter part 13 is provided with an inward-bent part 14 bent inwardly in the radial direction formed by blanking a lower end side inner bottom wall during drawing step in the press molding. If the shape thus obtained during the press-molding (drawing step) of the metal plate material is used as it is and the inward-bent part 14 of the cylindrical member 10 is formed in advance, then it is possible to reduce the cost of manufacturing a vibration isolator.

A rubber member 21 is provided by vulcanization and bonding on the upper end portion of the cylindrical member 10 to thereby close the opening portion thereby. The rubber member 21 is so formed as to be expanded in a hill form outward in the axial direction with respect to the upper end portion of the cylindrical member 10 and to extend almost at a point where the diameter starts widening inside the cylindrical member 10 almost in parallel to the right angle direction of the axis of the wider diameter part 11. A fitting member 31 made of a metal material is disposed coaxially at the central position of the rubber member 21. The fitting member 31 is of cylindrical shape and has a flange part 31a provided at the center in the axial direction. One side of the fitting member 31 with respect to the flange part 31a is buried into the rubber member 21 and the other side thereof protruding from the rubber member 21 is provided with a screw hole 31b for screwing a bolt at a coaxial position. A rubber member coated part 22 continuous to the rubber member 21 is provided on the inner peripheral surface of the cylindrical member 10 by vulcanization and bonding treatment. The rubber member coated part 22 has a thick intermediate coated part 22a ranging from the inside of the rubber member 21 to the almost axially central position of the cylindrical member 10, and a thin tip end coated part 22b ranging from the intermediate coated part 22a to the lower end of the part 22. A stepped part 22c is thereby formed at a boundary between the intermediate coated part 22a and the tip end coated part 22b.

An orifice member 32 and a diaphragm member 33, which serve as bottom wall members, are sequentially and coaxially inserted into the tip end coated part 22b of the rubber member coated part 22 from the axially inside toward the outside. The orifice member 32 is disc-shaped and has a thick annular part 32a on the peripheral edge portion thereof and a thin disc-shaped part 32b inside of the annular part 32a. A ring-shaped passage 32c is formed at the central position of the annular part 32a in the thickness direction thereof. Opening portions 32d and 32e leading to the passage 32c are provided in portions of both surfaces of the annular part 32a in the thickness direction, respectively. The diaphragm member 33 is provided with a thin film 33b made of rubber and bulging inward of a ring-shaped member 33a made of metal in the one axial direction. The thin film 33b is arranged to be expanded in the direction of the orifice member 32. A liquid chamber E is formed to be surrounded by the orifice member 32, the rubber member 21 and the rubber member coated part 22.

Figure 2:
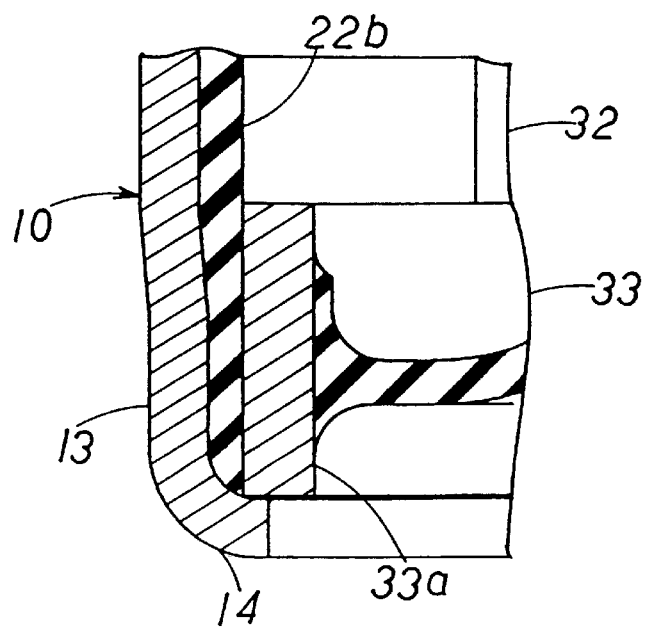
FIG. 2 is a partially cross sectional view showing an important part of the liquid filled vibration isolator.

As shown in FIG. 2, the inward-bent part 14 has a reduced diameter by the drawing of the cylindrical member 10 such that the inward-bent part 14 has an inner diameter of the tip end portion which is slightly smaller than the outer diameter of the member 33a of the diaphragm member 33. Owing to this, the lower end portion of the diaphragm member 33 is stopped by the inward-bent part 14 and prevented from slipping out of the cylindrical member 10.

Figure 3:
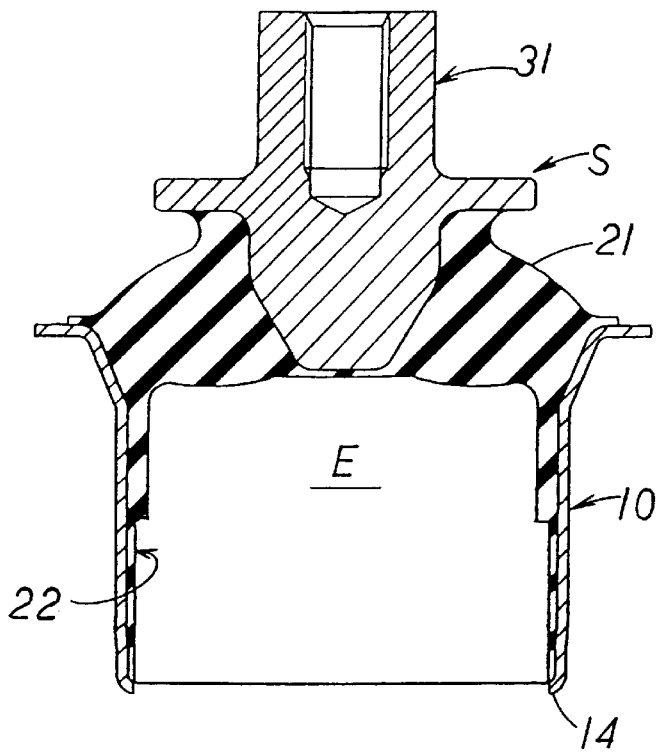
FIG. 3 is a cross sectional view showing a vibration isolator molding.

The formation of the above-stated liquid filled vibration isolator will now be described. First, as shown in FIG. 3, the cylindrical member 10 previously processed to be provided with the inward-bent part 14 on the lower end thereof and the fitting member 31 are installed into a predetermined mold (not shown). Then, the rubber member 21 and the rubber member coated part 22 are vulcanized and bonded by injecting a rubber material into the mold and are formed integral with each other, thereby obtaining a vibration isolator molding S before the diameter is reduced. A liquid chamber E of the molding S is filled with liquid and the orifice member 32 and the diaphragm member 33 are inserted into the tip end coated part 22b. In this case, since positioning is made by contacting the orifice member 32 with the stepped part 22c, the orifice member 32 and the diaphragm member 33 can be easily and accurately inserted into the tip end coated part 22b. Thereafter, drawing (diameter-reducing processing) is conducted to the lower end side cylindrical member 10. As a result, the cylindrical member 10 is fastened and the diameter of the inward-bent part 14 is reduced to thereby make the inner diameter of the part 14 smaller than the outer diameter of the member 33a of the diaphragm member 33. The liquid filled vibration isolator shown in FIG. 1 is thus obtained.

Figure 4:
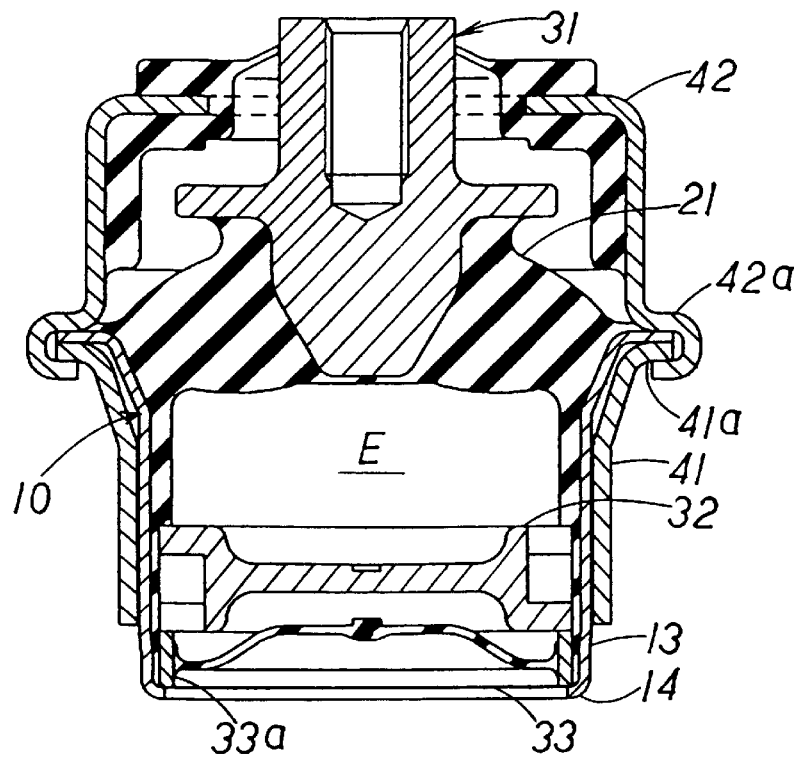
FIG. 4 is a cross sectional view showing the final shape of the liquid filled vibrator isolator.

As shown in FIG. 4, in this liquid filled vibration isolator, a cylindrical fixing member 41 made of a metal material is installed on the outer peripheral surface of the cylindrical member 10 and a flange part 41a of the fixing member 41 is overlapped by the flange part 12 of the cylindrical member 10. A stopper member 42 made of a metal material is covered on the rubber member 21 side. By bending a flange part 42a of the stopper member 42, the overlapped flange parts 12 and 41a are fastened and the stopper member 42, the fixing member 41 and the vibration isolator molding S are assembled integral with one another.

In the first embodiment having the above-stated structure, the inner diameter of the inward-bent part 14 on the lower end side of the cylindrical member 10 is smaller than the outer diameter of the member 33a of the diaphragm member 33, thereby allowing the member 33a of the diaphragm member 33 to be stopped by the inward-bent part 14. Thanks to this, even if the fastening force is lowered by the fatigue or the like of the rubber member coated part 22, it is ensured preventing the diaphragm member 33 from slipping out of the cylindrical member 10.

Next, the second embodiment according to the present invention will be described.

Figure 5:
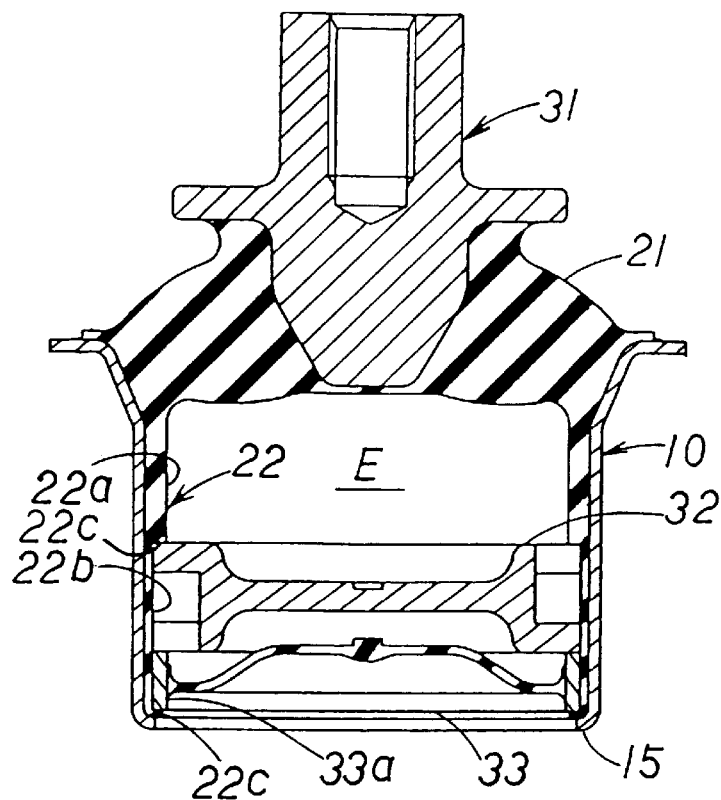
FIG. 5 is a cross sectional view showing a liquid filled vibrator isolator in the second embodiment according to the present invention.
Figure 6:
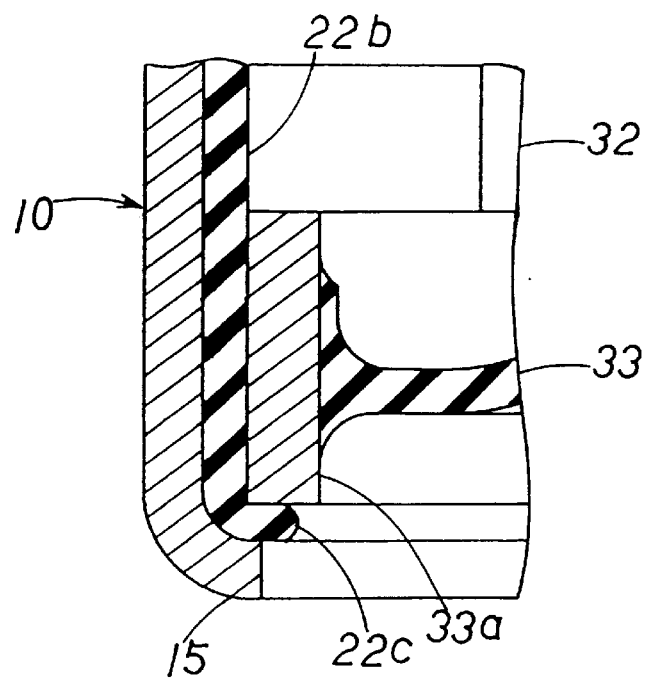
FIG. 6 is a partially cross sectional view showing an important part of the liquid filled vibration isolator.
Figure 7:
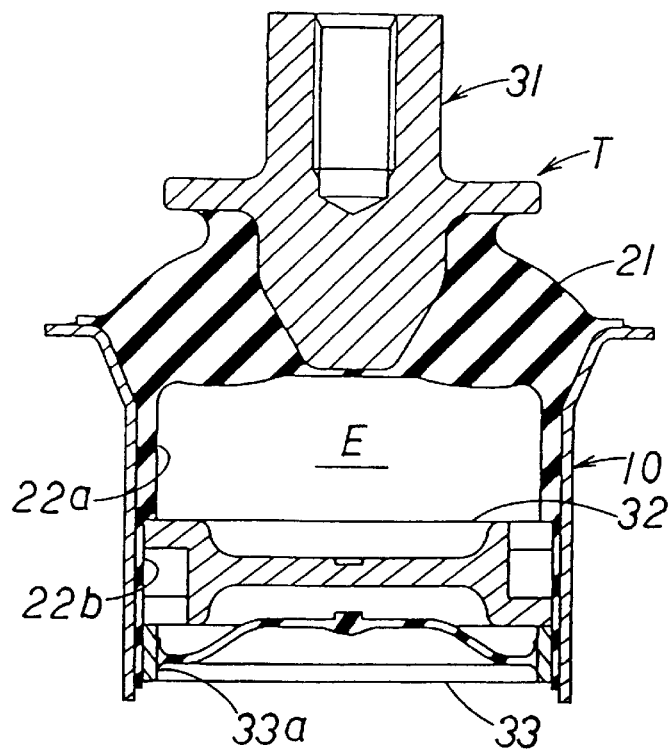
FIG. 7 is a cross sectional view showing a vibration isolator molding.
Figure 8:
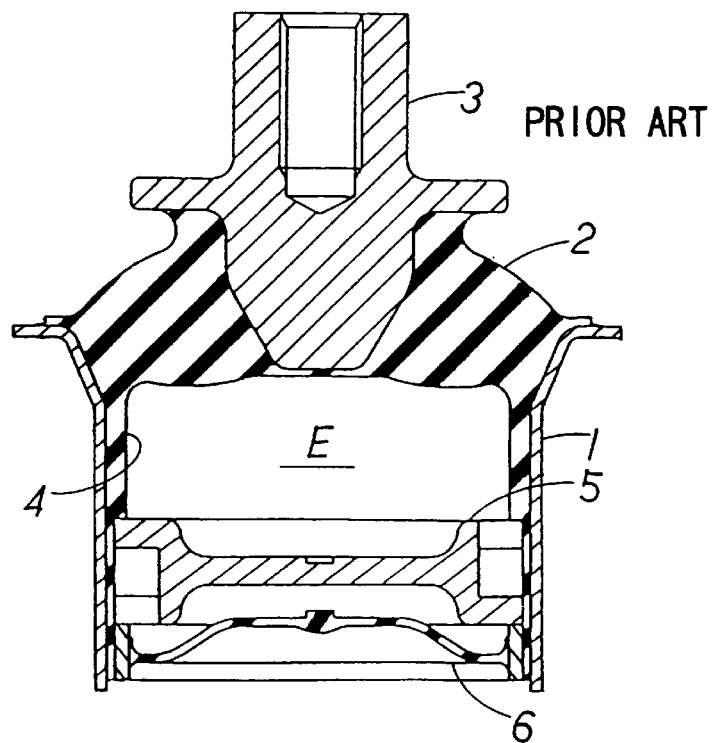
FIG. 8 is a cross sectional view showing a conventional liquid filled vibration isolator.

In the second embodiment, as shown in FIG. 7, an orifice member 32 and a diaphragm member 33 are inserted into a tip end coated part 22b on the lower end side of the a cylindrical member 10 having the straight lower end. The lower end side cylindrical member 10 is then subjected to drawing (diameter-reducing processing) to thereby fasten the cylindrical member 10. The lower end of the cylindrical member 10 is also subjected to bending to thereby form an inward-bent part 15. As shown in FIG. 5, therefore, the inner diameter of the inward-bent part 15 is almost equal to the outer diameter of the diaphragm member 33. By conducting drawing and bending at the same time, the tip end coated part 22b of the rubber member coated part 22 is compressed and, as shown in FIG. 6, expanded outward between the inward-bent part 15 and the diaphragm member 33. The expanded portion 22c of the tip end coated part 22b covers the lower-side outer peripheral portion of the diaphragm member 33 and the inner diameter of the tip end of the expanded portion 22c is smaller than the outer diameter of the diaphragm member 33.

The formation of the above-stated liquid filled vibration isolator will be described. First, as shown in FIG. 7, a rubber member 21 and a rubber member coated part 22 are formed integral with the cylindrical member 10 having a straight lower end and the fitting member 31, thereby forming a vibration isolator molding T before a diameter is reduced. A liquid chamber E of the molding T is filled with liquid and the orifice member 32 and the diaphragm member 33 are inserted into the tip end coated part 22b. At this time, the straight tip end of the cylindrical member 10 slightly protrudes from the diaphragm member 33 and so does the tip end coated part 22b. In this state, the drawing is conducted to the tip end side of the cylindrical member 10, thereby fastening the tip end side. Further, as shown in FIG. 6, the tip end side is bent, thereby bending the tip end of the cylindrical member 10 at right angle and forming the inward-bent part 15 having an inner diameter almost equal to the outer diameter of the member 33a of the diaphragm member 33. Following drawing and bending, as shown in FIG. 6, the tip end of the tip end coated part 22b is compressed and an expanded portion 22c expanded from the diaphragm member 33 and the inward-bent part 15 is formed. Thus, the expanded portion 22c covers the lower-side outer peripheral portion of the diaphragm member 33 and the inner diameter of the expanded portion 22c is made smaller than the outer diameter of the member 33a of the diaphragm member 33. This allows the diaphragm member 33 to be stopped by the expanded part 22c of the tip end coated part 22b.

As in the case of the first embodiment stated before, in this liquid filled vibration isolator, the cylindrical fixing member 41 is mounted on the outer peripheral surface of the cylindrical member 10 and the rubber member 21 side is covered with a stopper member 42. By bending a flange part 42a of the stopper member 42, the stopper member 42, the fixing member 41 and the vibration isolator molding T are incorporated integral with one another.

In the second embodiment having a structure stated above, the member 33a of the diaphragm member 33 is stopped by the expanded portion 22c of the tip end coated part 22b of the rubber member coated part 22. Due to this, even if the fastening force is lowered by, for example, the fatigue of the rubber member coated part 22, it is ensured preventing the diaphragm member 33 from slipping out of the cylindrical member 10.

It is noted that specific appearance and the like of the liquid filled vibration isolator according to the present invention should not be limited to the above-stated embodiments. It is possible to appropriately modify shapes of, for example, the cylindrical member 10, the rubber member 21 and the fitting member 31.

What is claimed is:

1. A liquid filled vibration isolator comprising:
   a cylindrical member made of a metal material;
   an inward-bent part slightly extending to one end side of said cylindrical member inwardly in a radial direction;
   a thin rubber member coated part provided on an inner peripheral surface of the cylindrical member, said rubber member coated part having an inner diameter equal to or smaller than an inner diameter of said inward-bent part;
   a bottom wall member inserted into from one end side of said cylindrical member and mounted on an inner peripheral surface of said rubber member coated part to close thereby an opening portion on the one side thereof;
   a rubber member subjected to vulcanization and bonding and a fitting member fixed to said rubber member provided on the other end side of said cylindrical member to close thereby an opening portion on the other end side thereof; and a liquid chamber for vibration isolation thereby formed inside the cylindrical member, wherein said inward-bent part is formed on said cylindrical member in advance prior to providing said thin rubber member coated part on the inner peripheral surface of the cylindrical member, and after said bottom wall member is inserted into the inner peripheral surface of said thin rubber member coated part, the inner diameter of said inward-bent part is made smaller than the outer diameter of said bottom wall member by pressing the cylindrical portion of said cylindrical member inwardly in a radial direction thereof to reduce the diameter of the cylindrical portion.

2. The liquid filled vibration isolator according to claim 1, wherein said inward-bent part is formed by conducting blanking to a collar-shaped inner bottom wall part formed integral with one end side of the cylindrical member while the cylindrical member is formed by press-molding a metal plate material, said inner bottom wall part extending inwardly in an radial direction.

3. The liquid filled vibration isolator according to claim 1 or 2, wherein a cylindrically protruding part slightly protrudes within a prescribed range from a prescribed position of said rubber member coated part in an axial direction to the other end side, along a circumferential direction and toward a radial direction, and a stepped part is provided at a boundary between the rubber coated part and the cylindrically protruding part.

* * * * *